(12) United States Patent
Syvret et al.

(10) Patent No.: US 9,744,700 B2
(45) Date of Patent: Aug. 29, 2017

(54) METHODS AND APPARATUS FOR FORMING WORKPIECE COMPONENTS

(71) Applicant: Aston Martin Lagonda Limited, Warwickshire (GB)

(72) Inventors: Andrew Syvret, Warwickshire (GB); David Martin, Warwickshire (GB)

(73) Assignee: ASTON MARTIN LAGONDA LIMITED, Gaydon (GB)

( * ) Notice: Subject to any disclaimer, the term of this patent is extended or adjusted under 35 U.S.C. 154(b) by 210 days.

(21) Appl. No.: 14/419,459

(22) PCT Filed: Jul. 31, 2013

(86) PCT No.: PCT/GB2013/052054
§ 371 (c)(1),
(2) Date: Feb. 3, 2015

(87) PCT Pub. No.: WO2014/020342
PCT Pub. Date: Feb. 6, 2014

(65) Prior Publication Data
US 2015/0217491 A1 Aug. 6, 2015

(30) Foreign Application Priority Data

Aug. 3, 2012 (GB) .................................. 1213961.4

(51) Int. Cl.
| B62D 35/00 | (2006.01) |
| B29C 43/50 | (2006.01) |
| B29C 70/46 | (2006.01) |
| B29C 70/66 | (2006.01) |
| B29C 70/84 | (2006.01) |
| B62D 25/10 | (2006.01) |

(Continued)

(52) U.S. Cl.
CPC .............. *B29C 43/50* (2013.01); *B29C 70/46* (2013.01); *B29C 70/66* (2013.01); *B29C 70/84* (2013.01); *B62D 25/105* (2013.01); *B62D 25/12* (2013.01); *B62D 29/043* (2013.01); *B62D 35/007* (2013.01); *B29L 2031/3005* (2013.01); *Y10T 428/13* (2015.01)

(58) Field of Classification Search
CPC ........ B62D 25/12; B62D 29/04; B62D 35/00; B29C 43/50
USPC ............................................ 296/180.1, 180.5
See application file for complete search history.

(56) References Cited

U.S. PATENT DOCUMENTS

| 4,847,024 A | 7/1989 | Loren |
| 5,172,954 A | 12/1992 | Yamazaki et al. |

(Continued)

FOREIGN PATENT DOCUMENTS

| DE | EP 2415575 A1 * | 2/2012 | ............. B29C 33/42 |
| DE | WO 2014111243 A3 * | 9/2014 | ......... B29C 67/0029 |

(Continued)

*Primary Examiner* — Pinel Romain
(74) *Attorney, Agent, or Firm* — Dorsey & Whitney LLP (57) ABSTRACT

A decklid (12) for an automobile (10) has an integral aerofoil (24) providing an aero duct (26) between the aerofoil (24) and an upper face section (16) of the decklid (12), the aerofoil (24) being produced hollow using a mandrel (106) to consolidate workpiece material (133) of the (aerofoil 24) inside a void (132) within mould parts (102), (104), the method and apparatus providing the decklid (12) with smoothly merging and continuous A surfaces, as well as smoothly merging B surfaces.

27 Claims, 4 Drawing Sheets

(51) Int. Cl.
 *B62D 29/04* (2006.01)
 *B62D 25/12* (2006.01)
 *B29L 31/30* (2006.01)

(56) References Cited

U.S. PATENT DOCUMENTS

| | | | |
|---|---|---|---|
| 7,625,618 | B1 | 12/2009 | Allen et al. |
| 7,686,384 | B2 * | 3/2010 | Paul .................... B62D 35/007 |
| | | | 180/68.1 |
| 8,124,219 | B2 * | 2/2012 | Miyachi ................ B29C 44/583 |
| | | | 264/45.5 |

FOREIGN PATENT DOCUMENTS

| | | |
|---|---|---|
| EP | 0363744 A2 | 4/1990 |
| GB | 2416145 A | 1/2006 |
| JP | 63-28611 A | 2/1988 |
| JP | 11-34935 A | 2/1999 |
| JP | 2890353 B2 * | 5/1999 ............. B29C 49/20 |

* cited by examiner

FIG. 8

METHODS AND APPARATUS FOR FORMING WORKPIECE COMPONENTS

CROSS-REFERENCE TO RELATED APPLICATIONS

This application is a national stage application under 35 U.S.C. §371 of International Application No. PCT/GB2013/052054 filed on Jul. 31, 2013, which claims priority to GB Patent Application No. 1213961.4 filed on Aug. 3, 2012, the contents of which are hereby incorporated by reference herein in their entirety for all purposes.

BACKGROUND

The present invention relates to methods of forming an apparatus for forming workpiece components. The invention in some more particular embodiments is concerned with hollow moulding processes and apparatus for forming hollow mouldings and workpieces formed by them, such as automotive workpieces including but not limited to body panels or components with A surfaces.

In one particular arrangement, the invention relates to a method of making an aerofoil for an automobile or other vehicle, the aerofoil having upper and lower surfaces experiencing airflow during use and typically although not necessarily being located in the region of a boot or decklid region of an automobile. A known such aerofoil is attached by separately formed connectors to the decklid region of an automobile. In some cases, such an aerofoil may be connected by a moveable connection means such that the configuration of the aerofoil relative to the main vehicle body may be changed dependent upon automobile speed. However, such arrangements are complex, they may experience sealing problems in the region of attachment of the aerofoil to the automobile body and the connections may cause unwanted aerodynamic drag. The connections may also be unsightly.

SUMMARY

The present invention aims to alleviate at least to a certain extent the problems of the prior art.

According to a first aspect of the present invention is provided a method of forming a workpiece component comprising a first workpiece structure and a second workpiece structure, the first and second workpiece structures having outer opposing surfaces spaced from and facing one another, the method comprising forming the first and second workpiece structures simultaneously on tooling having a split between two mould parts which extends between the first and second workpiece structures, and opening the moulding tooling at the split to release the workpiece component from the tooling with the first and second workpiece structures connected to one another. Advantageously, the method may allow the manufacture of integral moulded structures having surfaces opposed to or facing one another.

The method may include configuring workpiece materials within the mould tooling around a mandrel and curing or working the workpiece materials within the mould tooling with the mandrel inside the workpiece materials to form the second workpiece structure as a hollow moulded material workpiece structure e.g. of composite material. Advantageously therefore, a hollow weight-saving structure may be seamlessly attached to and integrally and simultaneously formed together with a further structure such as a body panel.

According to a further aspect of the present invention method of forming a hollow moulded material workpiece structure which comprises configuring workpiece materials within mould tooling around a mandrel, curing or working the workpiece materials within the mould tooling to form the hollow moulded material workpiece structure and removing the workpiece structure from the mould tooling. Advantageously therefore, a hollow weight-saving structure may be seamlessly attached to and integrally and simultaneously formed together with a further structure such as a body panel.

A further aspect of the invention provides a method of forming a workpiece component comprising a first workpiece structure and a second workpiece structure, the first and second workpiece structures having outer opposing surfaces spaced from and facing one another, the second workpiece being a hollow moulded material structure formed as set out in the second aspect of the invention, and in which the method includes forming the first and second workpiece structures simultaneously on tooling having a split between two mould parts which extends between the first and second workpiece structures, and opening the tooling at the split to release the workpiece component from the tooling with the first and second workpiece structures connected to one another. A hollow weight-saving structure like an aerofoil may thus be seamlessly joined to a further structure like a decklid main panel (e.g. of a decklid outer panel).

The method may include forming the workpiece component as an automotive structure.

The method may include forming the first workpiece structure as an automotive body panel.

The method may include forming the first workpiece structure as an automotive decklid panel, such as a decklid outer panel, and forming the second workpiece structure as an automotive aerofoil.

The method may include forming said opposing surfaces as a top surface of the decklid panel and a bottom surface of the aerofoil, the opposing surfaces defining an air duct between them.

The method may include forming the opposing surfaces and an upper surface of the aerofoil as A surfaces which are all one continuous topological surface, the air duct thereby being formed between opposing parts of the same continuous topological surface. Accordingly, a very high quality finish of a part which, in advance of the making of this invention, may have seemed very difficult or impossible to make may therefore be provided. Where a mandrel is used, the hollow second structure may be left with at least one open end through which the mandrel may be removed.

The method may include forming the aerofoil as a hollow aerofoil and with an inner surface of the hollow aerofoil as part of a second continuous topological surface which includes a lower B surface of the decklid panel.

The method may include forming a said workpiece structure as a hollow automotive aerofoil.

The hollow aerofoil may be made with one or both end portions thereof open to allow mandrel removal easily and such that the workpiece essentially has only two surfaces, an A surface and a B surface, plus peripheral edges. An open end portion of the hollow aerofoil may be flared to allow easy mandrel removal.

The method may include forming a said workpiece structure of laminated material.

The method may include forming a said workpiece structure of composite material including a cured resin or other cured polymeric material. The method may alternatively comprise forming a said workpiece structure of a non-composite or homogeneous—structure, material or other material, or thermosetting polymers formed RIM or RRIM.

The method may include providing at least one layer of carbon fibre material in the process of forming the composite material. The composite material may include at least two layers of thermo-setting polymers carbon fibre material which are spaced apart from one another by a further layer.

The method may include heating moulding tooling to cure a said workpiece structure.

Where a mandrel is provided as set out above, the method may include removing the mandrel from the second workpiece structure. The mandrel may be slid out of the hollow structure, such as after removing or reducing a tendency of the mandrel to take up an expanded form thereof.

The method may include removing the mandrel in a reusable form.

The method may include removing the mandrel when the workpiece materials are at least partly or at least substantially fully cured.

Where a mandrel is provided as set out above, the method may include compressing the workpiece materials by using the mandrel to apply pressure inside the workpiece material, preferably to consolidate the workpiece materials against inner tooling surfaces.

The method may include providing the mandrel as an expandable bladder and may include applying pressure, such as pneumatic or hydraulic pressure, to the expandable bladder inside the workpiece materials.

The method may include providing the mandrel as an element arranged to expand in response to a change in temperature in order to apply pressure inside the workpiece materials.

The method may include providing the mandrel as a silicone element (or silicone mandrel) and may include raising the temperature of the silicone element to cause it to tend to expand so as to apply pressure inside the workpiece materials.

The method may include forming the opposing surfaces of the first and second workpiece structures so as to merge seamlessly into one another in a region where the first and second workpiece structures are joined to one another.

The method may include forming the opposing surfaces as A surfaces.

The method may include forming the second workpiece structure hollow so as to have an inner surface and may include forming the inner surface so as to merge seamlessly into a B surface of the first workpiece structure.

The method may include providing the tooling with two solid parts which in the closed position define a void between them for forming the second workpiece structure and may include providing two said splits, one said split extending from a first exterior surface of the closed tooling to a part of the void which is, along a direction of the split, nearest to the first exterior surface.

The second said split may extend from a part of the void further or furthest from the first exterior surface to a second exterior surface of the closed tooling.

The method may include using the second exterior surface of the tooling as a moulding surface for forming the first workpiece structure.

In a further aspect of the invention a method of forming a finished automobile body work component comprises carrying out a method in accordance with an above aspect of the invention to form an A surface panel, such as a decklid outer panel and which includes finishing the bodywork component (such as a decklid) by performing steps including attaching a further panel (such as a decklid inner panel) to the A surface panel.

A further aspect of the invention comprises a method of manufacturing an automobile which includes carrying out a method as set out in a previously mentioned aspect of the invention.

A further aspect of the invention provides an apparatus for forming a workpiece component comprising a first workpiece structure and a second workpiece structure, the first and second workpiece structures having outer opposing surfaces spaced from and facing one another, the apparatus comprising mould tooling for forming the first and second workpiece structures simultaneously, the tooling having a split between two mould parts thereof, the split being arranged to extend between the first and second workpiece structures, the moulding tooling being arranged to open at the split to release the workpiece component from the tooling with the first and second workpiece structures connected to one another. The apparatus provides similar advantages to the methods set out above.

The apparatus may include a mandrel around which workpiece materials may be cured or worked within the mould tooling to form a hollow moulded material workpiece structure.

The mould tooling may be configured to form the first workpiece structure as an automotive body panel.

The mould tooling may be configured to form the first workpiece structure as an automotive decklid panel (such as a decklid outer panel) and to form the second workpiece structure as an automotive aerofoil.

The mould tooling may be arranged to form said opposing surfaces as a top surface of the decklid panel and a bottom surface of the aerofoil, the opposing surfaces defining an air duct between them.

The tooling may be configured to form the opposing surfaces and an upper surface of the aerofoil as A surfaces which are all one continuous topological surface, the air duct thereby being formable between opposing parts of the same continuous topological surface, which is an A surface. The surfaces are outside or customer-facing surfaces of the parts.

The mould tooling may be configured to form the aerofoil as a hollow aerofoil and with an inner surface of the hollow aerofoil as part of a second continuous topological surface which includes a lower B surface of the decklid panel. These surfaces are the reverse surfaces of A surfaces which are typically unseen once the product is complete.

The apparatus may include a heater for heating the mould tooling for curing a said workpiece structure.

The mould tooling and mandrel, where provided, may be configured to form a tunnel into at least one zone of said workpiece component through which the mandrel, after forming the second workpiece structure, is removable from the second workpiece structure.

The mandrel may be reusably removable from the second workpiece component with the second workpiece structure at least partly or at least substantially fully cured.

The mandrel may be arranged to squeeze workpiece materials to apply pressure inside the workpiece materials.

The mandrel may include an expandable bladder arranged to apply pressure, such as pneumatic or hydraulic pressure, inside the workpiece materials.

The mandrel may be arranged to tend to expand in response to a change in temperature in order to apply pressure inside the workpiece materials.

The mandrel may have a silicone element (or may simply be a silicone mandrel) arranged to tend to expand upon temperature increase so as to apply pressure inside the workpiece materials.

The mould tooling may be configured to form the opposing surfaces of the first and second workpiece structures to merge seamlessly into one another in a region where the first and second workpiece structures are joined to one another.

The mould tooling may be configured to form the opposing surfaces as A surfaces.

The mandrel and mould tooling may be configured to form the second workpiece structure hollow so as to have an inner surface thereof which merges seamlessly into a B surface of the first workpiece structure.

The mould tooling may have two solid parts which in the closed position define a void between them for forming the second workpiece structure and may include two said splits, one said split extending from a first exterior surface of the mould tooling to a part of the void nearest, along a direction of said split, to the first exterior surface.

The second said split may extend from a part of the void further or furthest from the first exterior surface to a second exterior surface of the closed tooling.

The second exterior surface of the tooling may be configured as a moulding surface for forming the first workpiece structure.

The invention also extends to workpiece components formed in accordance with the methods described above in accordance with aspects of the invention and to automobiles or other vehicles incorporating such workpiece components.

A further aspect of the invention provides a workpiece component comprising an automobile decklid, such as a rear decklid, or a decklid outer panel which includes a main panel surface and an aerofoil which is integrally formed with the main panel surface, the aerofoil being hollow, and preferably in which opposing surfaces of the aerofoil and main panel surface are spaced from one another to form an aero duct between them.

BRIEF DESCRIPTION OF THE DRAWINGS

The present invention may be carried out in various ways and examples of preferred methods and apparatus in accordance with the invention will now be described by way of example only and with reference to the accompanying drawings, in which.

DETAILED DESCRIPTION

Figure 1:
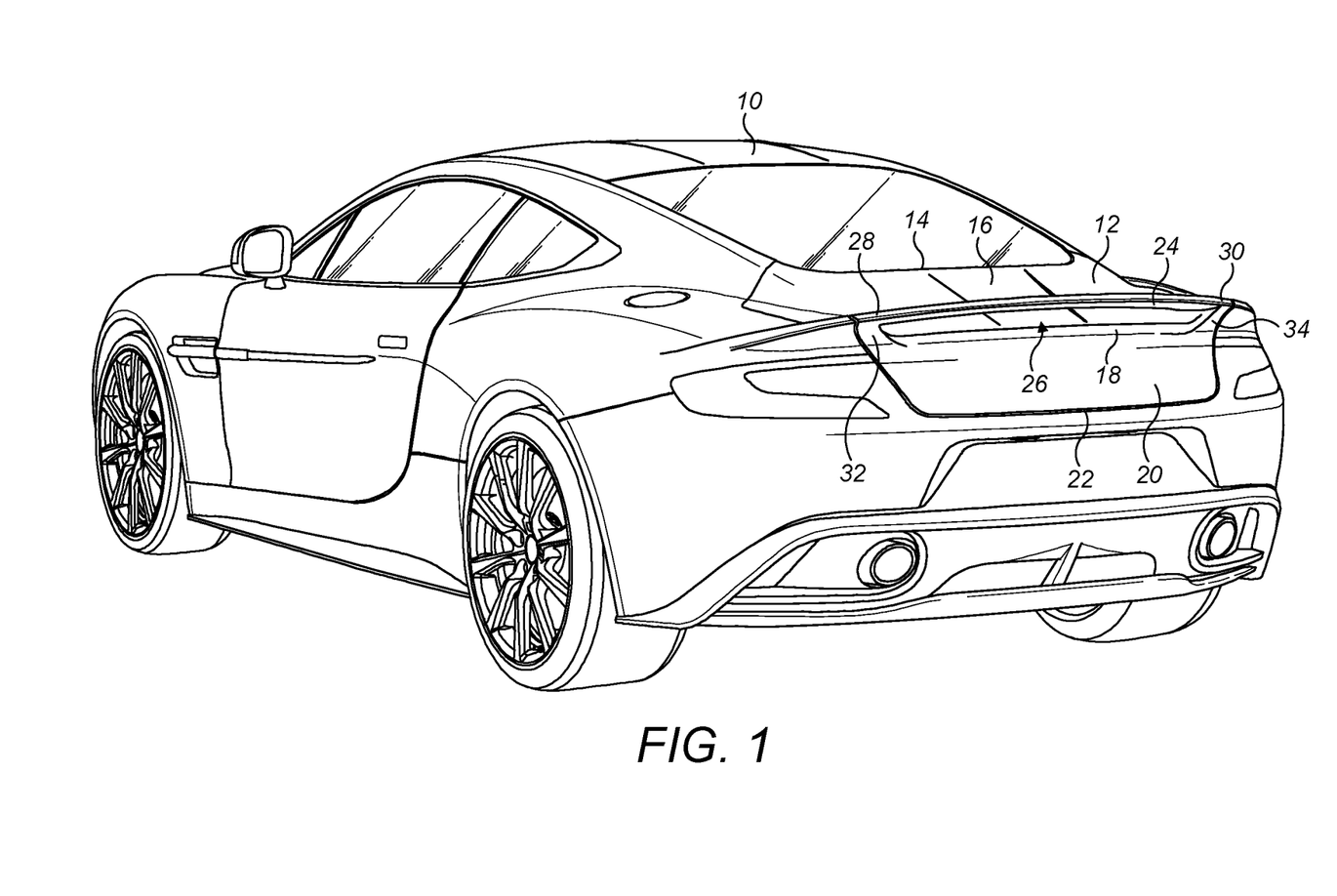
FIG. 1 is a rear quarter view of an automobile having a workpiece component in the form of a rear decklid which incorporates an aerodynamic wing or aerofoil and has been formed in accordance with a preferred embodiment of a method and apparatus in accordance with the present invention.

As shown in FIG. 1, an automobile 10 includes a workpiece component 12 in the form of a rear decklid upper or outer panel. The decklid outer panel 12 has a leading edge 14 from which it extends in a generally horizontal manner but rearwardly and slightly generally downwardly along a main upper face section 16 thereof to a drop edge 18 extending substantially fully from side to side of the decklid outer panel 12. The decklid outer panel 12 extends generally downwardly but slightly rearwardly from the drop edge 18 across a lower face section 20 of the decklid outer panel 12 to a trailing edge 22 of the decklid outer panel 12. A decklid inner panel (not shown) is attached to an underside of the decklid outer panel 12 to form a complete decklid panel which is attached to the main body of the automobile by hinges (not shown) near the leading edge 14 to allow a hinging open/close action for the decklid panel.

Near the drop edge 18, the decklid outer panel 12 includes an aerofoil 24 which extends substantially fully across or fully across the decklid outer panel 12 where it is spaced from the upper face section 16 and lower face section 20 by an aero duct 26 through which air may pass when automobile 10 is driven along. Left 28 and right 30 end portions of the aerofoil 24 are integrally joined by respective left and right 32, 34 connector portions of the decklid outer panel 12 to the upper face section 16 and lower face section 20 of the decklid outer panel 12. The upper face section 16, the lower face section 20, the aerofoil 24 and the connection portions 32, 34 are all integrally formed from carbon fiber resin composite materials. Other types of materials, such as RIM or RRIM thermosetting polymers or other non-composite materials, are envisaged in other embodiments.

Figure 3:
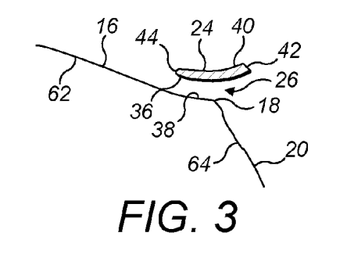
FIG. 3 is a section on the plane A-A through the decklid shown in FIG. 2.
Figure 4:
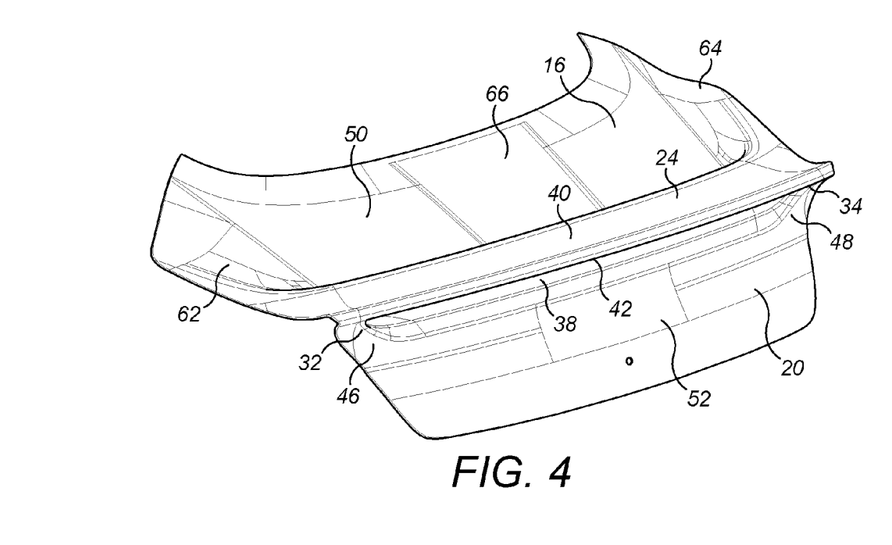
FIG. 4 is a rear quarter perspective view of the decklid.
Figure 5:
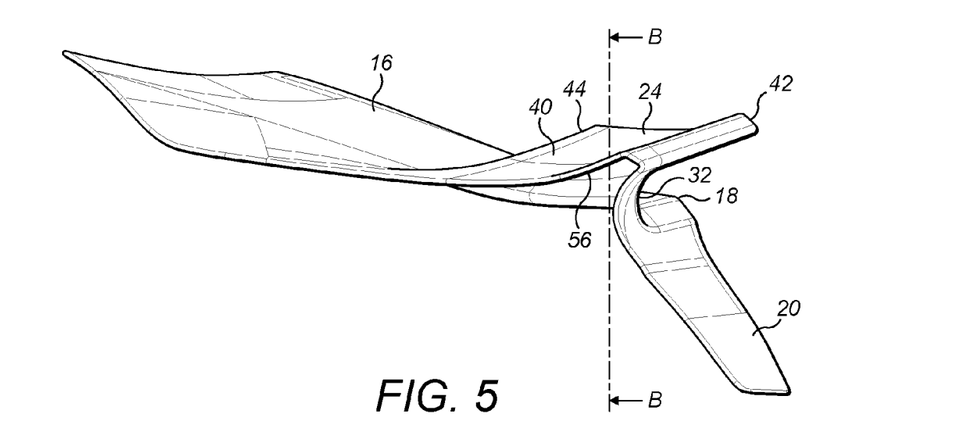
FIG. 5 is a side elevational view of the decklid.
Figure 6:
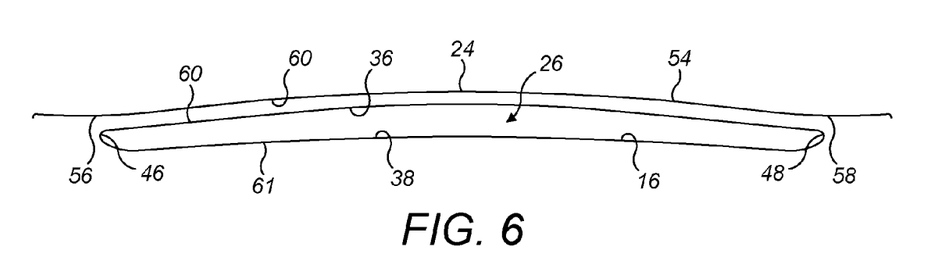
FIG. 6 is a schematic sectional view on the plane B-B through the decklid shown in FIG. 5.

As shown in FIG. 6, and in FIG. 3, the aerofoil 24 has a lower surface 36 which is spaced by the aero duct 26 from and opposes an upper surface region 38 of the upper face section 16 of the decklid outer panel 12. The aerofoil 24 also has an upper surface 40 as well as exterior trailing 42 and leading 44 edges.

The lower 36 and upper 40 surfaces of the aerofoil 24 and its leading 44 and trailing 42 exterior edge surfaces are configured to smoothly merge into and are one continuous topological surface together with the upper surface region 38 of the upper face section 16, exterior surfaces 46, 48 of the connector portions 32, 34 and exterior surfaces 50, 52 of the upper face section 16 lower face section 20, respectively. Furthermore, all of these surfaces are A surfaces. These surfaces are all exterior surfaces visible when the product is finished.

As shown in FIG. 3, the aerofoil 24 is hollow. As best shown in FIG. 6 in connection with FIG. 3, the hollow aerofoil 24 is essentially an elongate tube. The aerofoil 24 has a main central section 54 and flares/opens at ends 56, 58 to the tubular central section 54. This means that the inner surface 60 of the aerofoil 24 smoothly merges into and is a topologically continuous with the lower B surface 61 of the upper face section 16 and also the B surface 64 of the lower face section 20.

Thus, even though the lower surface 36 of the aerofoil 24 faces downwardly and opposes the upper surface region 38 of the upper face section 16 of the decklid outer panel 12, all of the surfaces facing the exterior atmosphere when the decklid outer panel 12 is fitted to the automobile 10 are A surfaces which smoothly and seamlessly merge into one another. Furthermore, the B surfaces are also seamlessly connected to one another.

At the sides of the decklid outer panel 12, left 62 and right 64 side portions of the main upper face section 16 which face upwardly smoothly merge into the upwardly facing upper surface 40 of the aerofoil 24 at the respective end portions 28, 30 thereof. However, a central portion 66 of the main upper face section 16 smoothly merges over the drop edge 18 into the exterior surface 52 of the lower face section 20 of the decklid outer panel 12.

Figure 7:
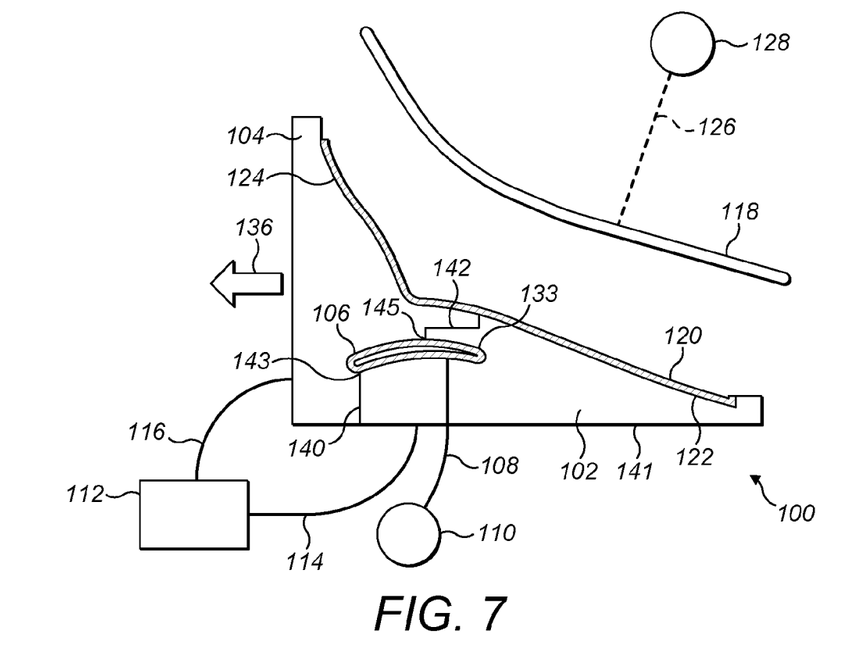
FIG. 7 schematically shows mould tooling used in producing the decklid of FIGS. 1 to 6.

The decklid outer panel 12 may be produced by the apparatus 100 shown in FIG. 7. The apparatus 100 comprises mould tooling having a first fixed mould part 102 and a second moveable mould part 104. Also provided is a mandrel 106 which is an inflatable bladder and is connected by an air line 108 to an air pump 110. A heater 112 is connected by paths 114, 116 to the fixed 102 and moveable 104 mould parts respectively. Heater components (not shown) may in this embodiment or others be integrally included within the mould parts 102, 104. The apparatus 100 also includes an intensifier 118 which may be physically pushed down onto workpiece material 120 (in this case layered carbon fiber/resin component material) in order to push the workpiece material 120 down onto cooperating surfaces 122, 124 of the fixed and moveable mould parts 102, 104 respectively. In other embodiments, the intensifier 118 may be replaced by a vacuum sheet 118 connected by a line 126 to a vacuum source 128 for consolidating the workpiece material 120 on to the mould parts 102, 104.

Figure 2:
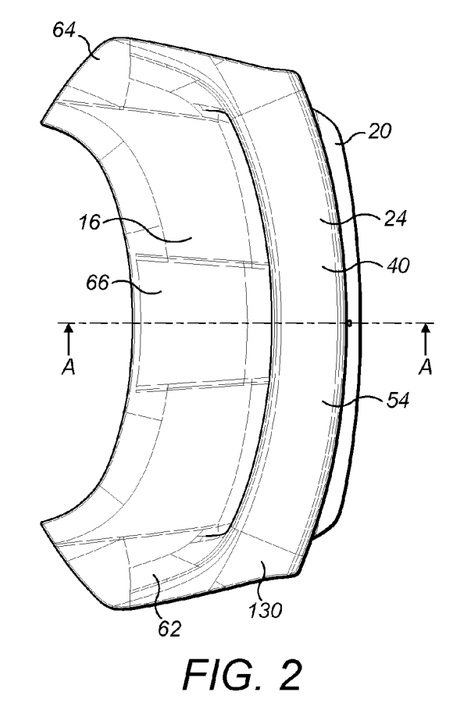
FIG. 2 a top plan view of the decklid.
Figure 8:
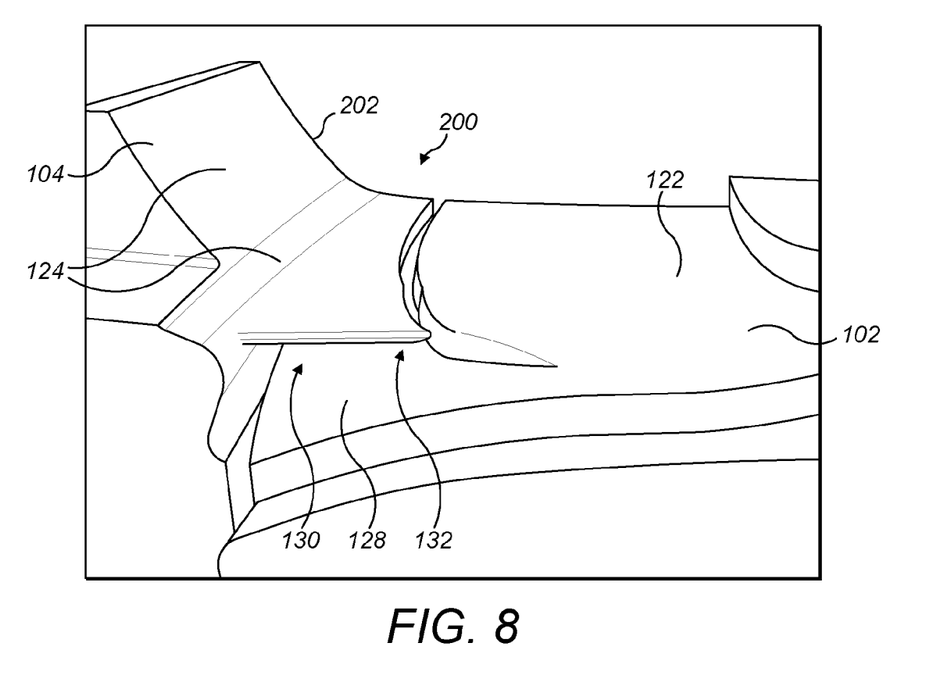
FIG. 8 is a schematic side view of tooling similar to that shown in FIG. 7.

A view of apparatus 200 similar to the fixed 102 and moveable 104 mould parts is provided in FIG. 8. In fact, FIG. 8 shows only a half mould cut along a vertical and longitudinally extending plane 202 which would be half way across the decklid outer panel 12. Similar reference numerals are used in FIG. 8 to those used in FIG. 7 for similar parts. It will be apparent from FIG. 8 that the cooperating surface 122 for forming the A surface towards the front of the central portions 66 of the decklid smoothly merges into shoulder portions 128 of the mould part 102 which will form the A surface of the upper left end surface 130 (see FIG. 2) of the aerofoil 24. The mould parts 102, 104 form a tunnel entrance 130 between them which leads into a void 132 between the mould parts 102, 104 which extends fully across the tooling in order to be able to manufacture the aerofoil 24 integrally with the rest of the decklid outer panel 12.

In order to make the decklid outer panel 12, the mandrel 106 is first wrapped with composite workpiece materials 133 which may be formed of layers similar to those of the workpiece material 120. The mandrel 106 and the workpiece materials 133 wrapped around it may then be placed in/on the fixed mould part 102 and the moveable part 104 may then be closed on to the fixed mould 102. Next, the workpiece materials 120 may be laid upon the surfaces 122, 124 of the mould parts 102, 104. The heater 112 may then be operated to perform a heating cycle appropriate for curing the composite materials in question during at least part of which the intensifier 118 may be pushed down onto the workpiece materials 120 to consolidate them and the air pump 110 may be operated to apply pressure tending to inflate the expandable air bladder of the mandrel 106 in order to consolidate the workpiece materials 133 of the structure which will form the hollow aerofoil 24. Once the composite materials have sufficiently cured and the heating cycle has been completed, the air pump 110 may be switched off to allow the mandrel 106 to relax, the intensifier 118 may be removed, the moveable mould 104 may be moved to the left as shown by the arrow 136 in FIG. 7, the mandrel 106 may then be slid out of the end 56 of the hollow aerofoil 24 and the completed decklid outer panel 12 may be removed from apparatus 100 and subjected to minor finishing operations.

Although a heater 112 is provided in this embodiment, it is envisaged that in other embodiments the apparatus 100 could be heated in a heating cycle in an oven.

The method and apparatus described may therefore enable the manufacture of a hollow moulding such as a hollow aerofoil which develops from a single surface. Using a split tool in which the first and second mould parts 102, 104 are split from one another by lower 140 and upper 142 split lines, and using a removable and reusable mandrel, such a hollow moulding may be produced. As can be seen in FIG. 7, the first lower split line 140 extends from a bottom surface 141 of the mould parts 102, 104 to a lower most part 143 of the aerofoil 24 (when it is upside down in the mould parts 102, 104) and a dogleg is provided in the upper split line 142 extending between an upper most part 145 of the aerofoil 24 (when it is upside down in the moulds 102, 104) to the composite materials 120. The dogleg in which the split line 142 is not just one identifiable surface is used to avoid undercuts in positions of the mould laterally to the side of the central plane, (or "Y=0" plane), of the tools 102, 104, that Y=0 plane being the one which is essentially shown as a cross-section in FIG. 7.

The use of the mandrel 106 which can tend to expand to consolidate the hollow moulding against the tool faces is also highly advantageous. A lightweight hollow structure which is well shaped and consolidated may be produced. In other embodiments, the expandable bladder may be replaced so as to provide the mandrel as a silicone mandrel instead which will expand during the heating cycle, for example consolidating the material of the hollow moulding of the aerofoil 24 against the tool face at or above 90° C.

The method and apparatus also advantageously allow the moulding of a homogeneous or seamless surface for the A surfaces as described above and preferably also for the B surfaces, thereby providing extremely smoothly formed surfaces which when used with a decklid aerofoil with an aero duct 26 between the aerofoil 24 and decklid upper face section 16 allow for optimum aerofoil performance without joints or connections likely to interfere with airflow. The tool faces of the tooling which provide the A surfaces are also of minimum complexity since only one moving part 104 is required. The ability to use the mandrel by using the void 132 and tunnel entrance 130 arrangement whereby the mandrel can be removed out of the aerofoil enables the workpiece/aerofoil 24 to be provided at minimum mass, which is advantageous for fuel economy and vehicle handling reasons. Additionally, the workpiece component 12 such as a decklid outer panel 12, requires only minimal post-moulding work to finish the part, since the A surfaces are all moulded integrally and smoothly merging into one another as a continuous and homogenous topological surface. The same is so for the inwardly facing surfaces to the rear of the A surfaces (B surfaces).

Although the preferred method and apparatus have been described in relation to the production of a decklid outer panel 12 with an integral aerofoil 24, it is envisaged that the invention is applicable to many other types of automotive components such as body work panels and structural components where smooth forming of surfaces and weight saving may be desirable. It is also envisaged that in some embodiments, the method and apparatus may be employed to components required outside the automobile field, such as in relation to motor cycles, pedal cycles, other land vehicles, as well as in marine and aerospace environments.

Various modifications may be made to the embodiments described without departing from the scope of the invention as defined by the accompanying claims.

The invention claimed is:

1. A method of forming a workpiece component comprising a first workpiece structure and a second workpiece structure, the first and second workpiece structures having outer opposing surfaces spaced from and facing one another, the method comprising forming the first and second workpiece structures simultaneously on tooling having a split between two mould parts which extends between the first and second workpiece structures, and opening the moulding tooling at the split to release the workpiece component from the tooling with the first and second workpiece structures connected to one another.

2. A method as claimed in claim 1, further comprising, forming at least one of the first or second workpiece structures of laminated material or composite material including a cured resin or other cured polymeric material, which includes providing a layer of carbon fibre material in the process of forming the composite material.

3. A method as claimed in claim 1, further comprising configuring workpiece materials within the mould tooling around a mandrel and curing or working the workpiece materials within the mould tooling with the mandrel inside the workpiece materials to form the second workpiece structure as a hollow moulded material workpiece structure.

4. A method as claimed in claim 3, wherein compression is applied to the workpiece materials by using the mandrel to apply pressure inside the workpiece materials, the method further comprising providing the mandrel as an expandable bladder and applying pressure to the expandable bladder inside the workpiece materials.

5. A method as claimed in claim 1, further comprising forming the workpiece component as an automotive structure including forming the first workpiece structure as an automotive body panel.

6. A method as claimed in claim 5, further comprising forming the first workpiece structure as an automotive decklid panel, forming the second workpiece structure as an automotive aerofoil, and forming the opposing surfaces as a top surface of the decklid panel and a bottom surface of the aerofoil, the opposing surfaces defining an air duct between them.

7. A method as claimed in claim 6, further comprising forming the opposing surfaces and an upper surface of the aerofoil as A surfaces which are all one continuous topological surface, the air duct thereby being formed between opposing parts of the same continuous topological surface.

8. A method as claimed in claim 7, further comprising forming the aerofoil as a hollow aerofoil and with an inner surface of the hollow aerofoil as part of a second continuous topological surface which includes a lower B surface of the decklid panel.

9. A method as claimed in claim 1, further comprising forming the opposing surfaces of the first and second workpiece structures so as to merge seamlessly into one another in a region where the first and second workpiece structures are joined to one another.

10. A method as claimed in claim 9, wherein the opposing surfaces are formed as A surfaces.

11. A method as claimed in claim 9, wherein the second workpiece structure is formed hollow so as to have an inner surface and which includes forming the inner surface so as to merge seamlessly into a B surface of the first workpiece structure.

12. A method as claimed in claim 1, wherein the tooling has two solid parts which in the closed position define a void between them for forming the second workpiece structure and in which two said splits are provided, one said split extending from a first exterior surface of the closed tooling to a part of the void which is, along a direction of the split, nearest to the first exterior surface, and in which a second said split extends from a part of the void further or furthest from the first exterior surface to a second exterior surface of the closed tooling.

13. Apparatus for forming a workpiece component comprising a first workpiece structure and a second workpiece structure, the first and second workpiece structures having outer opposing surfaces spaced from and facing one another, the apparatus comprising mould tooling for forming the first and second workpiece structures simultaneously, the tooling having a split between two mould parts thereof, the split being arranged to extend between the first and second workpiece structures, the moulding tooling being arranged to open at the split to release the workpiece component from the tooling with the first and second workpiece structures connected to one another.

14. Apparatus as claimed in claim 13, further comprising a mandrel around which workpiece materials may be cured or worked within the mould tooling to form a hollow moulded material workpiece structure.

15. Apparatus as claimed in claim 14, wherein the mandrel is arranged to compress workpiece materials to apply pressure inside the workpiece materials, and wherein the mandrel includes an expandable bladder arranged to apply pressure inside the workpiece materials.

16. Apparatus as claimed in claim 14, wherein the mould tooling is configured to form the opposing surfaces of the first and second workpiece structures to merge seamlessly into one another in a region where the first and second workpiece structures are joined to one another.

17. Apparatus as claimed in claim 16, wherein the mould tooling is configured to form the opposing surfaces as A surfaces.

18. Apparatus as claimed in claim 16, wherein the mandrel and mould tooling are configured to form the second workpiece structure hollow so as to have an inner surface thereof which merges seamlessly into a B surface of the first workpiece structure.

19. Apparatus as claimed in claim 13, wherein the mould tooling is configured to form the first workpiece structure as an automotive body panel.

20. Apparatus as claimed in claim 19, wherein the mould tooling is arranged to form the opposing surfaces as a top surface of the decklid panel and a bottom surface of the aerofoil, the opposing surfaces defining an air duct between them.

21. Apparatus as claimed in claim 20, wherein the tooling is configured to form the opposing surfaces and an upper surface of the aerofoil as A surfaces which are all one continuous topological surface, the air duct thereby being formable between opposing parts of the same continuous topological surface, which is an A surface.

22. Apparatus as claimed in claim 21, wherein the mould tooling is configured to form the aerofoil as a hollow aerofoil and with an inner surface of the hollow aerofoil as part of a second continuous topological surface which includes a lower B surface of the decklid panel.

23. Apparatus as claimed in claim 19, wherein the mould tooling is configured to form the first workpiece structure as an automotive decklid panel or decklid outer panel and to form the second workpiece structure as an automotive aerofoil.

24. Apparatus as claimed in claim 13, wherein the mould tooling has two solid parts which in the closed position define a void between them for forming the second workpiece structure and in which two said splits are provided, one said split extending from a first exterior surface of the closed tooling to a part of the void, along a direction of said split, nearest to the first exterior surface.

25. Apparatus as claimed in claim 24, wherein a second said split extends from a part of the void further from the first exterior surface to a second exterior surface of the closed tooling.

26. Apparatus as claimed in claim 25, wherein the second exterior surface of the tooling is configured as a moulding surface for forming the first workpiece structure.

27. A workpiece component comprising an automobile decklid or decklid outer panel, which includes a main panel surface and a hollow aerofoil integrally formed with the main panel surface in which opposing surfaces of the aerofoil and main panel surface are spaced from one another to form an aero duct between them, wherein the inner surface of the hollow aerofoil forms part of a continuous topological surface which includes the lower B surface of the main panel surface.

* * * * *